(12) United States Patent
Ellison et al.

(10) Patent No.: US 7,096,497 B2
(45) Date of Patent: *Aug. 22, 2006

(54) FILE CHECKING USING REMOTE SIGNING AUTHORITY VIA A NETWORK

(75) Inventors: Carl M. Ellison, Portland, OR (US); Roger A. Golliver, Beaverton, OR (US); Howard C. Herbert, Phoenix, AZ (US); Derrick C. Lin, Foster City, CA (US); Francis X. McKeen, Portland, OR (US); Gilbert Neiger, Portland, OR (US); Ken Reneris, Woodinville, WA (US); James A. Sutton, Portland, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

This patent is subject to a terminal disclaimer.

(21) Appl. No.: 09/823,131

(22) Filed: Mar. 30, 2001

(65) Prior Publication Data

US 2002/0144140 A1    Oct. 3, 2002

(51) Int. Cl.
G06F 11/30 (2006.01)
H04L 9/00 (2006.01)
(52) U.S. Cl. .................... 726/22; 713/176
(58) Field of Classification Search ............... 713/200, 713/175–177; 717/173, 178; 382/100; 283/73; 726/22
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |

(Continued)

FOREIGN PATENT DOCUMENTS

DE    4217444    12/1992

(Continued)

OTHER PUBLICATIONS

Goldberg, R., "Survey of virtual machine research," IEEE Computer Magazine 7(6), pp. 34-45, 1974.

(Continued)

*Primary Examiner*—Emmanuel L. Moise
*Assistant Examiner*—Minh Dieu Nguyen
(74) *Attorney, Agent, or Firm*—Blakely, Sokoloff, Taylor & Zafman LLP

(57) ABSTRACT

A file is sent to a remote signing authority via a network. The signing authority checks the file and provides a signature indicating file integrity of the file. The signature returned from the signing authority via the network is verified.

26 Claims, 7 Drawing Sheets

U.S. PATENT DOCUMENTS

| | | | |
|---|---|---|---|
| 4,571,672 A | 2/1986 | Hatada et al. | |
| 4,759,064 A | 7/1988 | Chaum | |
| 4,795,893 A | 1/1989 | Ugon | |
| 4,802,084 A | 1/1989 | Ikegaya et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,437,033 A | 7/1995 | Inoue et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,724,425 A | 3/1998 | Chang et al. | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,778,070 A | 7/1998 | Mattison | |
| 5,796,845 A | 8/1998 | Serikawa et al. | |
| 5,805,712 A | 9/1998 | Davis | |
| 5,809,546 A | 9/1998 | Greenstein et al. | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,872,994 A | 2/1999 | Akiyama et al. | |
| 5,890,189 A | 3/1999 | Nozue et al. | |
| 5,901,225 A | 5/1999 | Ireton et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,953,502 A | 9/1999 | Helbig, Sr. | |
| 5,956,408 A | 9/1999 | Arnold | |
| 5,956,481 A * | 9/1999 | Walsh et al. | 713/200 |
| 5,970,147 A | 10/1999 | Davis | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,094,731 A * | 7/2000 | Waldin et al. | 714/38 |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 * | 4/2001 | Reardon | 713/165 |
| 6,222,923 B1 | 4/2001 | Schwenk | |
| 6,249,872 B1 | 6/2001 | Wildgrube et al. | |
| 6,252,650 B1 | 6/2001 | Nakaumra | |
| 6,253,374 B1 | 6/2001 | Dresevic et al. | |
| 6,269,392 B1 | 7/2001 | Cotichini et al. | |
| 6,272,533 B1 | 8/2001 | Browne | |
| 6,272,637 B1 | 8/2001 | Little et al. | |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,314,409 B1 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |

| | | | |
|---|---|---|---|
| 6,507,904 | B1 | 1/2003 | Ellison et al. |
| 6,529,909 | B1 | 3/2003 | Bowman-Amuah |
| 6,535,988 | B1 | 3/2003 | Poisner |
| 6,557,104 | B1 | 4/2003 | Vu et al. |
| 6,560,627 | B1 | 5/2003 | McDonald et al. |
| 6,609,199 | B1 | 8/2003 | DeTreville |
| 6,611,925 | B1 * | 8/2003 | Spear .................... 714/38 |
| 6,615,278 | B1 | 9/2003 | Curtis |
| 6,633,963 | B1 | 10/2003 | Ellison et al. |
| 6,633,981 | B1 | 10/2003 | Davis |
| 6,651,171 | B1 | 11/2003 | England et al. |
| 6,678,825 | B1 | 1/2004 | Ellison et al. |
| 6,684,326 | B1 | 1/2004 | Cromer et al. |
| 6,745,306 | B1 * | 6/2004 | Willman et al. ............ 711/163 |
| 6,802,012 | B1 * | 10/2004 | Smithson et al. ........... 713/200 |
| 6,826,687 | B1 | 11/2004 | Rohatgi |
| 2001/0021969 | A1 | 9/2001 | Burger et al. |
| 2001/0027511 | A1 | 10/2001 | Wakabayashi et al. |
| 2001/0027527 | A1 | 10/2001 | Khidekel et al. |
| 2001/0037450 | A1 | 11/2001 | Metlitski et al. |
| 2002/0007456 | A1 | 1/2002 | Pienado et al. |
| 2002/0103783 | A1 | 8/2002 | Muhlestein |
| 2003/0018892 | A1 | 1/2003 | Tello |
| 2003/0196085 | A1 | 10/2003 | Lampson et al. |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| GB | EP 1069745 A1 * | 1/2001 |
| JP | 02000076139 A | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO99/65579 | 12/1999 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Gum, P.H., "System/370 Extended Architecture: Facilities for Virtual Machines," IBM J. Research Development, vol. 27, No. 6, pp. 530-544, Nov. 1983.

Resenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

J. Heinrich: "MIPS R4000 Microprocessor User's Manual," Apr. 1, 1993, MIPS, MT. VIEW, XP002184449, pp. 61-97.

Joe Heinrich:"MIPS R4000 Microprocessor User's Manual", 1994, MIPS Technology Inc., Mountain View, CA, pp. 67-79.

"M68040 User's Manual", 1993, Motorola Inc., p. 1-5—p. 1-9, p. 1-13-p. 1-20, p. 2-1-p. 2-3, p. 4-1, p. 8-9-p. 8-11.

"Intel 386 DX Microprecessor 32-Bit CHMOS Microprocessor With Integrated Memory Management", Dec. 31, 1995, Intel Inc., p. 32-56; figure 4-14.

Berg C: "How Do I Create a Signed Applet?", Dr. Dobb's Journal, M&T Publ., Redwood City, CA, US, vol. 22, No. 8, Aug. 1997, p. 109-111, 122.

Gong L et al: "Going Beyond the Sandbox: an Overview of the New Security Architecture in the JAVA Development Kit 1.2", Proceedings of the Usenix Symposium on Internet Technologies and Systems, Montery, CA Dec. 1997, pp. 103-112.

Coulouris, George , et al., "Distributed Systems, Concepts and Designs", 2nd Edition, (1994),422-424.

Crawford, John , "Architecture of the Intel 80386", *Proceedings of the IEEE International Conference on Computer Design: VLSI in Computers and Processors (ICCD '86)*, (Oct. 6, 1986), 155-160.

Fabry, R.S. , "Capability-Based Addressing", *Fabry, R.S., "Capability-Based Addressing," Communications of the ACM*, vol. 17, No. 7, (Jul. 1974), 403-412.

Frieder, Gideon , "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004, (Nov. 2000), 1-6, 17-28.

Intel Corporation, "Intel IA-64 Architecture Software Developer's Manual", *Volume 2: IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237, (Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce , "Applied Cryptography: Protocols, Algorithm, and Source Code in C", *Wiley, John & Sons, Inc.*, XP002939871; ISBN 0471117099,(Oct. 1995),47-52.

Schneier, Bruce , "Applied Cryptography: Protocols, Algorithm, and Source Code in C", *Wiley, John & Sons, Inc.*, XP002138607; ISBN 0471117099,(Oct. 1995),56-65.

Schneier, Bruce , "Applied Cryptography: Protocols, Algorithms, and Source Code C", *Wiley, John & Sons, Inc.*, XP002111449; ISBN 0471117099,(Oct. 1995),169-187.

Schneier, Bruce , "Applied Cryptography: Protocols, Algorithms, and Source Code in C", *2nd Edition: Wiley, John & Sons, Inc.*, XP002251738; ISBN 0471128457,(Nov. 1995),28-33; 176-177; 216-217; 461-473; 518-522.

Brands, Stefan, "Restrictive Blinding of Secret-Key Certificates", *Springer-Verlag XP002201306*, (1995),Chapter 3.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko , et al., "Design and Implementation of Dynamically Reconstructing System Software", *Software Engineer-*

*ing Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC*, USA XP002201307, (1997),475.

Richt, Stefan , et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering*, University of California, San Diego, La Jolla, CA, (Nov. 2001).

"Information Display Technigue for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

\* cited by examiner

FILE CHECKING USING REMOTE SIGNING AUTHORITY VIA A NETWORK

BACKGROUND

1. Field

This invention relates to microprocessors. In particular, the invention relates to processor security.

2. General Background

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modern microprocessor systems provide users convenient and efficient methods of doing business, communicating and transacting, they are also vulnerable for unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may occur in a number of forms. For instance, an invasive remote-launched attack by hackers may disrupt the normal operation of a system connected to thousands or even millions of users. A virus program may corrupt code and/or data operating on a single-user platform or may propagate itself to other platforms when connected to a network. Although anti-virus programs have been developed to scan, detect and eliminate known viruses, a large performance penalty would be incurred if an anti-virus program is required to examine every file before it can be opened.

BRIEF DESCRIPTION OF THE DRAWINGS

The features and advantages of the present invention will become apparent from the following detailed description of the present invention in which.

DESCRIPTION

The invention relates in general to a method and apparatus to check file integrity remotely. In one embodiment, a file is sent from a platform to a signatory via a network. The signatory checks the file and a digital signature chain is returned to the platform upon verifying the integrity of the file. As an alternative embodiment, the file checking operation is performed internally within the platform.

Within the platform, the file is accessed based on a verified digital signature chain. The file is not opened if (1) no digital signature chain is associated with the file, (2) the digital signature chain is provided by an unauthorized signatory, or (3) the digital signature chain indicates an unacceptable file integrity upon verification. The file may be opened if the verified digital signature chain indicates acceptable file integrity.

Herein, terminology is used to discuss certain features of the present invention. For example, a "platform" may generally be considered as hardware equipment and/or software that process information. Some illustrative examples of a platform include a computer (e.g., desktop, a laptop, a hand-held, a server, a workstation, etc.), communication device (e.g., router, bridge, brouter, etc.), a wireless telephone handset, a television set-top box, and the like. A "file" is generally considered herein as a collection of information in a selected format. Various types of files include code (e.g., source, object, executable, applets, operating systems, etc.), a digital document (e.g., word processing, spreadsheet, etc.), an electronic mail (e-mail) message and the like. "Information" includes data, address and/or control.

With respect to cryptography related terminology, a "key" is an encoding and/or decoding parameter. The term "signatory" is defined as a manufacturer, a trade association, a governmental entity, a bank, a particular department of a company (e.g., security or the information technology "IT" department or any other entity or person in a position of trust) and/or a platform controlled by the signatory. A "digital signature chain" includes an ordered sequence of digital signatures and/or certificates arranged for authorization purposes, where a certificate may be used to authenticate the authority of a signatory of a corresponding digital signature.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

A. ARCHITECTURE OVERVIEW: FILE CHECKER IMPLEMENTED IN SIGNATORY DIRECTLY IN COMMUNICATIONS WITH THE REQUESTING PLATFORM

Figure 1:
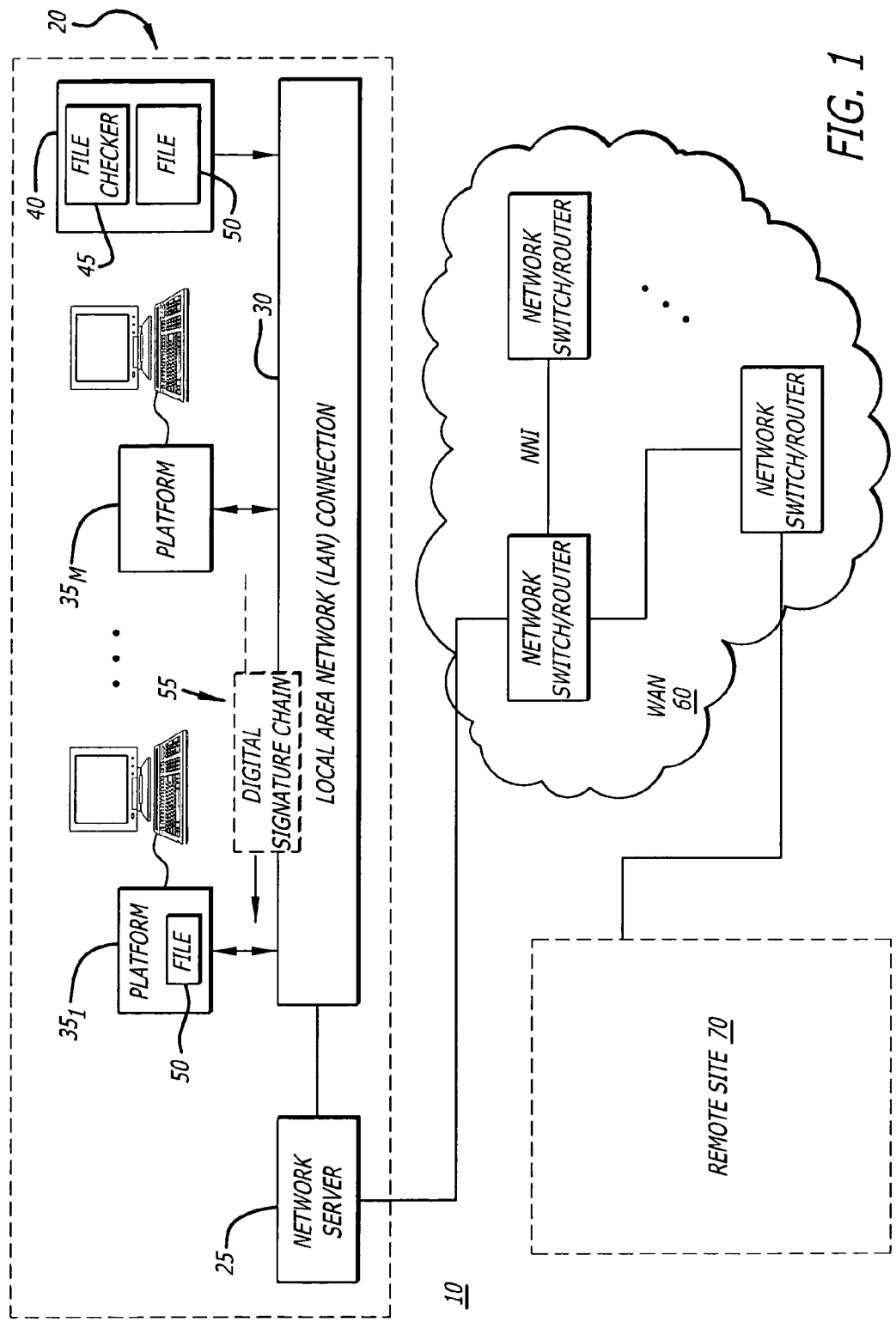
FIG. 1 is an exemplary embodiment of a network configured for that a first embodiment of the invention can be practiced.

Referring to FIG. 1, an exemplary embodiment of a network 10 adapted to perform an embodiment of the invention is shown. The network 10 includes a subnetwork 20, a wide area network (WAN) 60, and/or a remote site 70. A file checking mechanism (referred to as a "file checker") is hardware and/or software configured to check file integrity, detect virus infection, detect intrusion or any combination thereof. The file checker may be employed within a platform of the subnetwork 20 or coupled to a local area network (LAN) connection of the subnetwork 20 as described below. Alternatively, the file checker may be employed within the remote site 70 in communication with the WAN 60.

The subnetwork 20 represents a local area network (LAN) in a network system. The subnetwork 20 includes a network server 25, a LAN connection 30, platforms $35_1$–$35_M$ ("M" being a whole number, $M \geq 1$) and/or a local signatory 40. The subnetwork 20 is typically an intranet or a group within an organization. The subnetwork 20 connects all users of the platforms $35_1$–$35_M$ and the signatory of a signatory 40 in the group together. When used in association with a signatory, the term "local" generally means that the signatory 40 is normally closer in physical proximity to the platforms $35_1$–$35_M$ and directly connected to the subnetwork 20, and is used to distinguish from a remote signatory as discussed later.

The subnetwork 20 allows these users to participate in group activities such as conferencing, meeting, information exchange, document downloading, and resource sharing. In particular, the subnetwork 20 allows one of the platforms $35_1$–$35_M$ (e.g., the platform $35_1$) to request the signatory 40 to analysis the integrity of an uploaded file and to produce a digital signature as an output if the integrity of the uploaded file is verified. The network server 25 provides users of the LAN accesses to the WAN 60.

Figure 2:
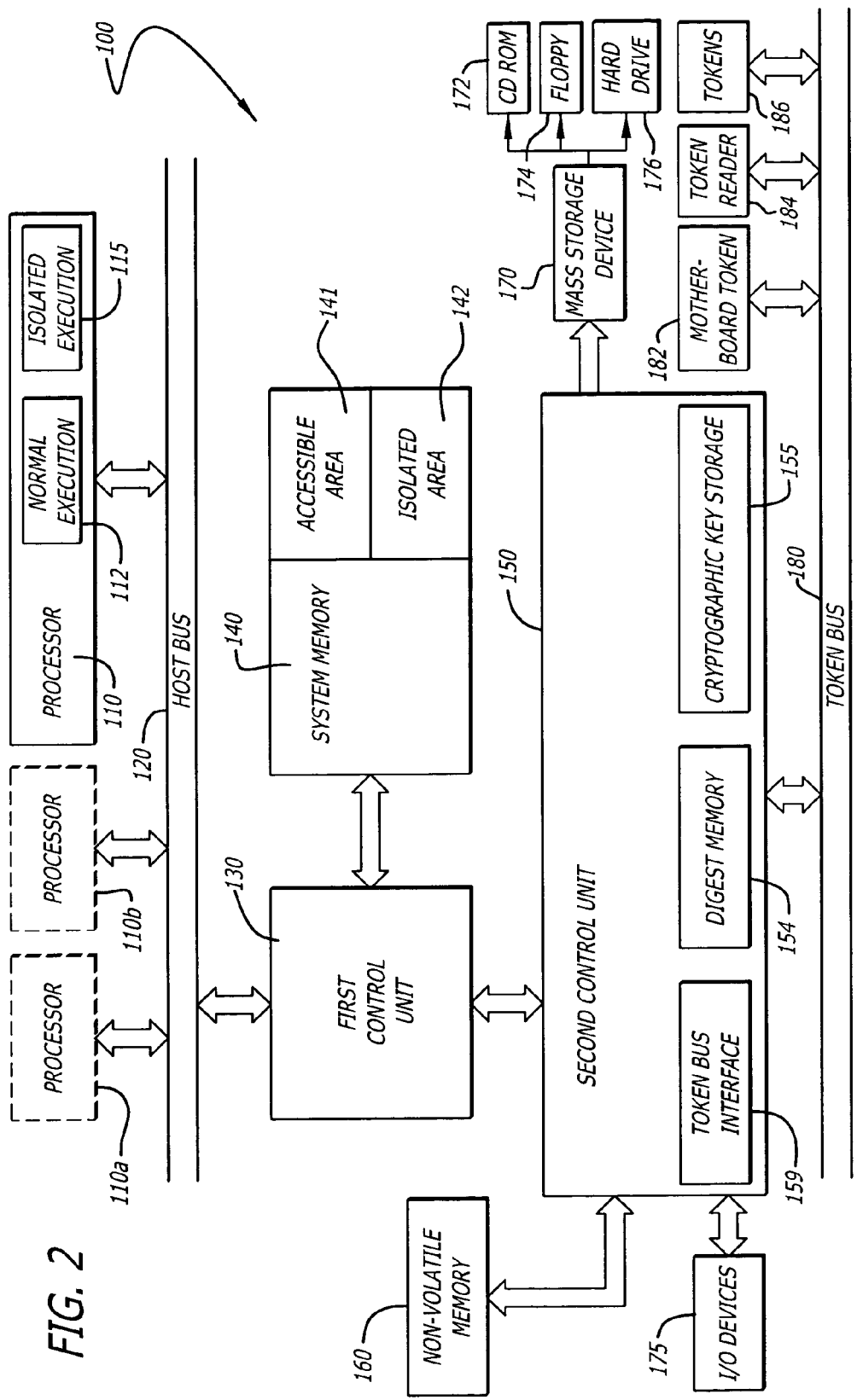
FIG. 2 is an exemplary embodiment of a platform employed in a network as shown in FIG. 1.

Referring now to FIG. 2, an exemplary embodiment of any platform $35_1$–$35_M$ is shown. For instance, platform $35_1$ comprises a processor 110, a host bus 120, a first control unit 130, and a system memory 140. As an option, the first platform 20 further comprises a second control unit 150, a non-volatile memory or system flash 160, a mass storage device 170, input/output devices 175, a token bus 180, a motherboard (MB) token 182, a reader 184, and other types of token(s) 186. The first control unit 130 may be integrated into a chipset that integrates multiple functionalities including memory control. Similarly, the second control unit 150 may also be integrated into a chipset together or separate from the first control unit 130 to perform input/output (I/O) functions. For clarity, not all of the peripheral buses are shown. It is contemplated that the platform $35_1$ may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the PENTIUM® series, the IA-32™ and the IA-64™.

In one embodiment, the platform $35_1$ can be a single processor system, such as a desktop computer, which has only one main central processing unit, e.g. processor 110. In other embodiments, the platform $35_1$ can include multiple processors, e.g. processors 110, 110a, 110b, etc., as optionally shown by dashed lines. Thus, the platform $35_1$ can be a multi-processor system having any number of processors. For example, the multi-processor system can operate as part of a server or workstation environment. It will be appreciated by those skilled in the art that the basic description and operation of processor 110 applies to the other processors 110a and 110b as well as any number of other processors that may be utilized in the multi-processor system according to one embodiment of the invention.

The processor 110 may also have multiple logical processors. A logical processor, sometimes referred to as a thread, is a functional unit within a physical processor having an architectural state and physical resources allocated according to some partitioning policy. A multi-threaded processor is a processor having multiple threads or multiple logical processors. Thus, a multi-processor system may have multiple multi-threaded processors.

The host bus 120 provides interface signals to allow the processor(s) 110, 110a, and/or 110b to communicate with other processors or devices, e.g., the first control unit 130. Herein, the first control unit 130 provides control and configuration of memory and I/O devices such as the system memory 140 or the second control unit 150. The first control unit 130 provides interface circuits to recognize and service isolated access assertions on memory reference bus cycles, including isolated memory read and write cycles. In addition, the first control unit 130 may include memory range registers (e.g., base and length registers) to represent an amount of access protected area in the system memory 140.

The system memory 140 stores files such as code and/or data. The system memory 140 is typically implemented with dynamic random access memory (DRAM) or static random access memory (SRAM). In one embodiment, system memory 140 may be partitioned into an accessible area 141 and an isolated area 142. Access to the isolated area 142 is restricted and is enforced by the processor 110 and/or the first control unit 130.

The second control unit 150 includes a digest memory 154, a cryptographic key storage 155, and a token bus interface 159. The digest memory 154, typically implemented in RAM, stores one or more digests (e.g., hash values) of various files. The cryptographic key storage 155 holds one or more keys that are unique for the platform of the platform $35_1$. In one embodiment, the cryptographic key storage 155 includes internal fuses that are programmed at manufacturing. Alternatively, the cryptographic key storage 155 may also be created with a random number generator and a strap of a pin. The token bus interface 159 interfaces to the token bus 180.

Certain secondary devices are in communication with and, in some instances, under control of the second control unit 150. For example, the internal memory 160 stores information in a non-volatile manner. Typically, the internal memory 160 is implemented with flash memory. The mass storage device 170 stores archive information (e.g., files) on machine-readable media and provides a mechanism to read information from the machine-readable media. The mass storage device 170 may include compact disk (CD) ROM 172, floppy diskettes 174, and hard drive 176, and any other magnetic or optic storage devices.

When implemented in software, the elements of the present invention are code segments performing necessary tasks. The program or code segments can be stored in machine-readable medium or embodied in a signal propagating over a transmission medium. The "machine-readable medium" may include any medium that can store or transfer information. Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. Examples of the "transmission medium" include electrical conduits (wire, bus traces, etc.), optical fiber(s), air, and the like. The code segments may be downloaded via computer networks such as the Internet, Intranet, etc.

I/O devices 175 may include any I/O devices to perform I/O functions. Examples of I/O devices 175 include controller for input devices (e.g., keyboard, mouse, trackball, pointing device), media card (e.g., audio, video, graphics), network card, and any other peripheral controllers.

The token bus 180 provides an interface between the second control unit 150 and various tokens in the platform. A token is a device that performs dedicated input/output functions with security functionalities. A token has characteristics similar to a smart card, including one or more keys and the ability to sign data. Examples of tokens connected to the token bus 180 include a motherboard token 182, a token reader 184, and other portable tokens 186 (e.g., smart card, biometric identifier, etc.).

Referring back to FIG. 1, either the local signatory 40 or the remote signatory 80 (referred to generically as "signatory 40/80") is implemented with a file checker 45 to check the integrity of an uploaded file 50 provided by the requesting platform $35_1$. In general, the file 50 contains code, data, or a combination thereof. The requesting platform $35_1$ may acquire the file 50 through any number of ways. For example, the requesting platform $35_1$ may receive the file 50 from another platform, either within the subnetwork 20 or in any other subnetwork. The requesting platform $35_1$ may also acquire the file 50 via other media such as from a floppy diskette, a CD ROM, or by downloading a file attached to an e-mail or from a commercial site. After acquiring the file 50, the requesting platform $35_1$ does not attempt to open it. Instead, the requesting platform $35_1$ assumes the file 50 is bad until the file integrity has been verified by the signatory 40/80.

In particular, with respect to the first embodiment of the invention, the requesting platform $35_1$ requests file checking by routing the file 50 to the signatory 40 as shown in FIG. 1. Implemented with file checker 45, the signatory 40 analyzes the uploaded file 50 to verify file integrity and has the authority or capability to issue a digital signature chain associated with the uploaded file 50. In one embodiment, the signatory 40 utilizes a platform employing the file checker 45 as shown above.

Herein, as one embodiment, the file checker 45 is typically either an antivirus program, a virus detector, or an intrusion detector. The virus detector may be a commercial virus detector program or a specially designed virus detector. Examples of the file checker include MCAFEE® programs, NORTON® antivirus programs and the like.

The signatory 40 receives the file 50 via the LAN connection 30. It is noted that when the file 50 is sent via the network, either LAN or WAN, there is a chance of a security breach. The file 50 may be intercepted by an intruder monitoring the network traffic. In an intranet or group environment, this scenario is highly unlikely because the security of the network is tight. Over the WAN 60, however, the probability for security breach is higher and therefore this mechanism is more suitable for files without encryption requirements.

After receiving the file 50, the signatory 40 analyzes the file 50 and detects if there is any virus infection or intrusion. The signatory 40 then generates a digital signature chain 55 (e.g., a digital signature) that verifies the integrity of the file 50, and returns the digital signature chain 55 back to the requesting platform $35_1$. When there are many files to be checked, there may be a need to identify which file the signatory 40 is associated with. The signatory 40, therefore, may contain a file identifier so that the requesting platform $35_1$ can know which file the signatory 40 is associated with.

Figure 3:
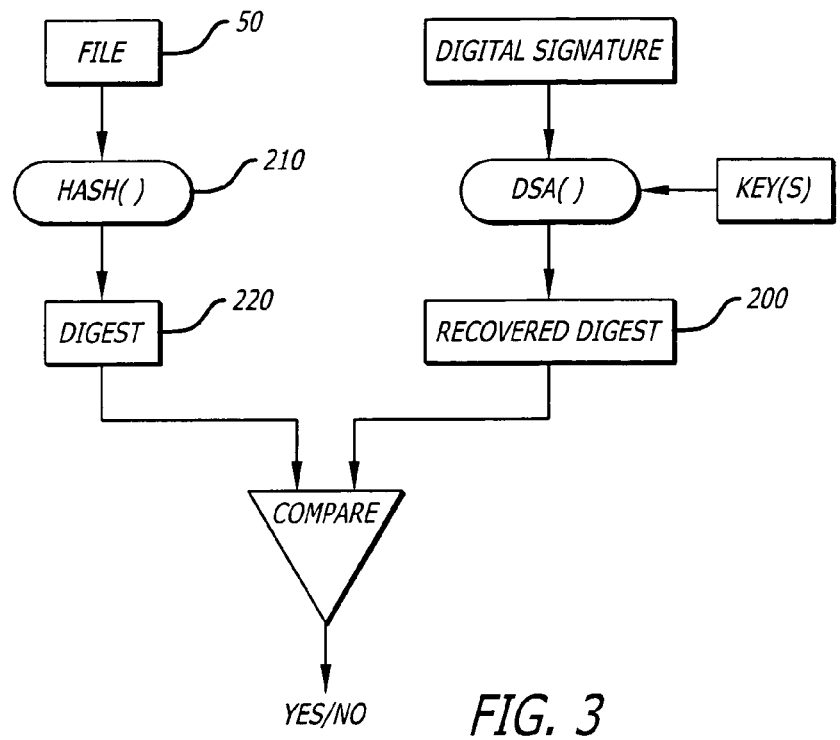
FIG. 3 is an exemplary embodiment of a verification scheme performed by the requesting platform to verify that the signatory failed to detect an abnormality in the uploaded file.

Referring now to FIG. 3, one exemplary embodiment of a verification scheme performed by the requesting platform $35_1$ to verify that the signatory 40 failed to detect an abnormality in the uploaded file 50 is shown. Upon receipt of the digital signature chain 55, namely a digital signature for clarity sake, the platform $35_1$ recovers contents of the digital signature. The recovered contents of the digital signature include a digest 200 of the uploaded file. In addition, the file 50 undergoes a hash function 210 to produce a digest 220. If the digest 210 matches the recovered digest 200, the integrity of the file 50 has been verified and the platform $35_1$ allows the file to be opened and/or executed.

Of course, verification scheme described above is for illustrative purposes only. Other verification schemes are possible. For example, the contents (e.g. an alphanumeric statement) may be recovered from the digital signature chain 55. The contents may indicate if the file integrity is acceptable, unacceptable or questionable, requiring human analysis.

B. ARCHITECTURE OVERVIEW: FILE CHECKER IMPLEMENTED IN REMOTE SIGNATORY INDIRECTLY IN COMMUNICATIONS WITH THE REQUESTING PLATFORM

Figure 4:
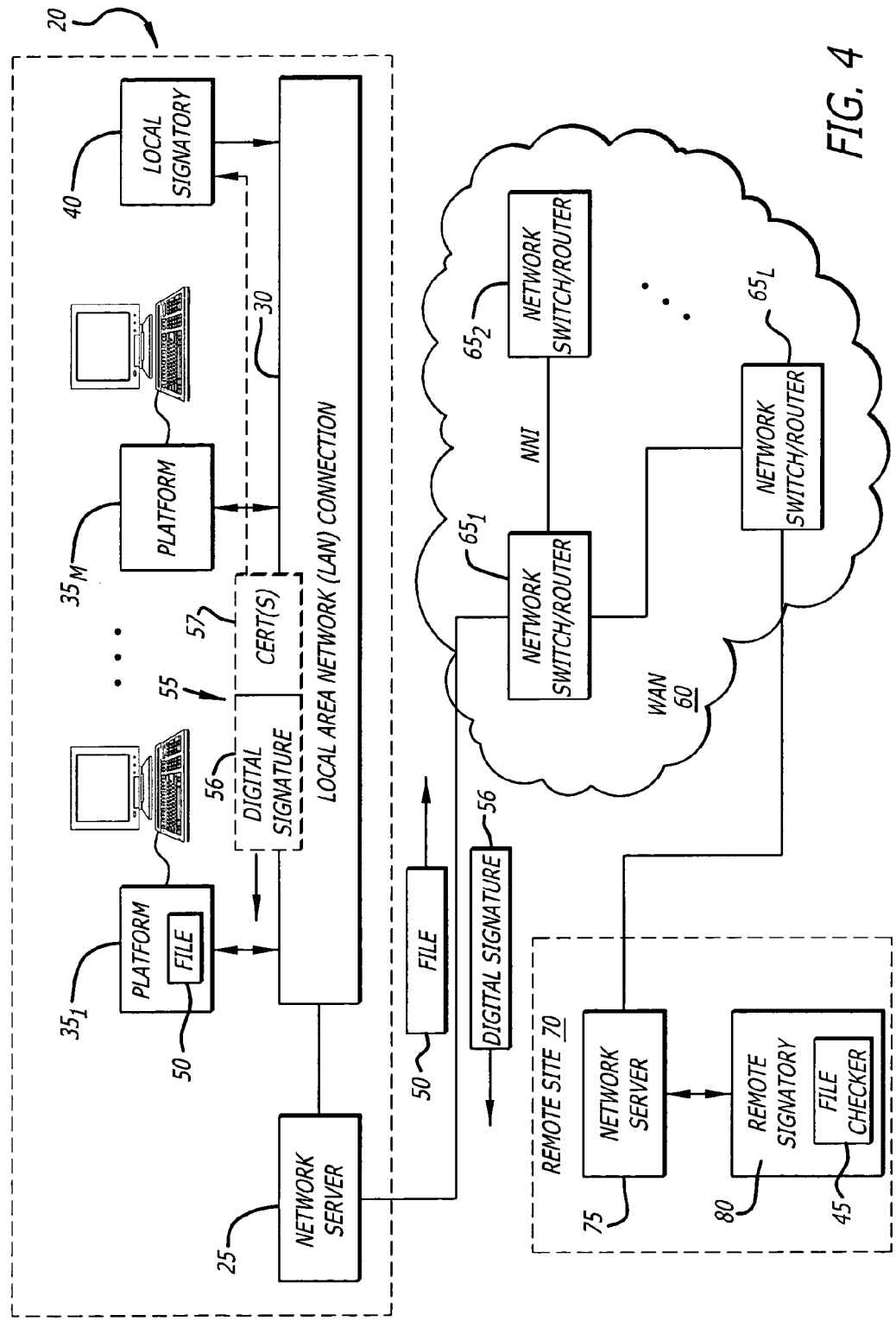
FIG. 4 is an exemplary embodiment of a network configured for that a second embodiment of the invention can be practiced.

Referring to FIG. 4, an exemplary embodiment of a network 10 configured in accordance with a second embodiment of the invention is shown. As described above, the network 10 includes the subnetwork 20, the WAN 60 and the remote site 70. Herein, for this embodiment, the WAN 60 provides public accesses to other subnetworks or commercial sites. The WAN 60 may be the Internet, the world wide web (WWW), or any other wide area networks. The WAN 60 includes network switches/routers $65_1$–$65_L$ (when $L \geq 1$). The network switches/routers $65_1$–$65_L$ regulate and route traffic in the network 10. The network switches/routers $65_1$–$65_L$ are linked by network-network interface (NNI) links. The network switches/routers may be asynchronous transfer mode (ATM) switches/routers, or any other network switches or routers.

The remote site 70 provides services to the public or registered users. The remote site 70 includes a server 75 and a remote signatory 80. The server 75 provides connection to the WAN 60 to handle incoming and outgoing traffic. The remote signatory 80 is capable of digitally signing files received from other subnetworks such as the subnetwork 20. The remote signatory 80 also has the ability to check file integrity, detect virus infection, and intrusion. One example of the remote signatory 80 may include a website managed by McAfee.com Corporation or Symantec Corporation of Cupertino, Calif. (NORTON® antivirus tools).

In particular, with respect to the second embodiment of the invention, the requesting platform $35_1$ requests file checking remotely by routing the file 50 to the local signatory 40. In response, the local signatory 40 redirects the file 50 to the remote signatory 80. Implemented with file checker 45, the remote signatory 80 analyzes the uploaded file 50 to verify file integrity and has the authority or capability provided from the remote signatory 80 to issue a digital signature associated with the uploaded file 50. The remote signatory 80 may employ a platform running the file checker 45.

After receiving the file 50, the remote signatory 80 analyzes the file 50 and detects if there is any virus infection or intrusion. The remote signatory 80 then generates a digital signature 56 (e.g., a digital signature as shown) that verifies the integrity of the file 50, and returns the digital signature 56 back to the local signatory 40. In response to receiving the digital signature 56, the local signatory 40 provides the digital signature chain 55, including the digital signature 56 and its accompanying digital certificate 57. The digital certificate 57 provides information to the platform $35_1$ that the remote signatory 80 has been authorized by the local signatory 40 to analyze the uploaded file 50.

Figure 5:
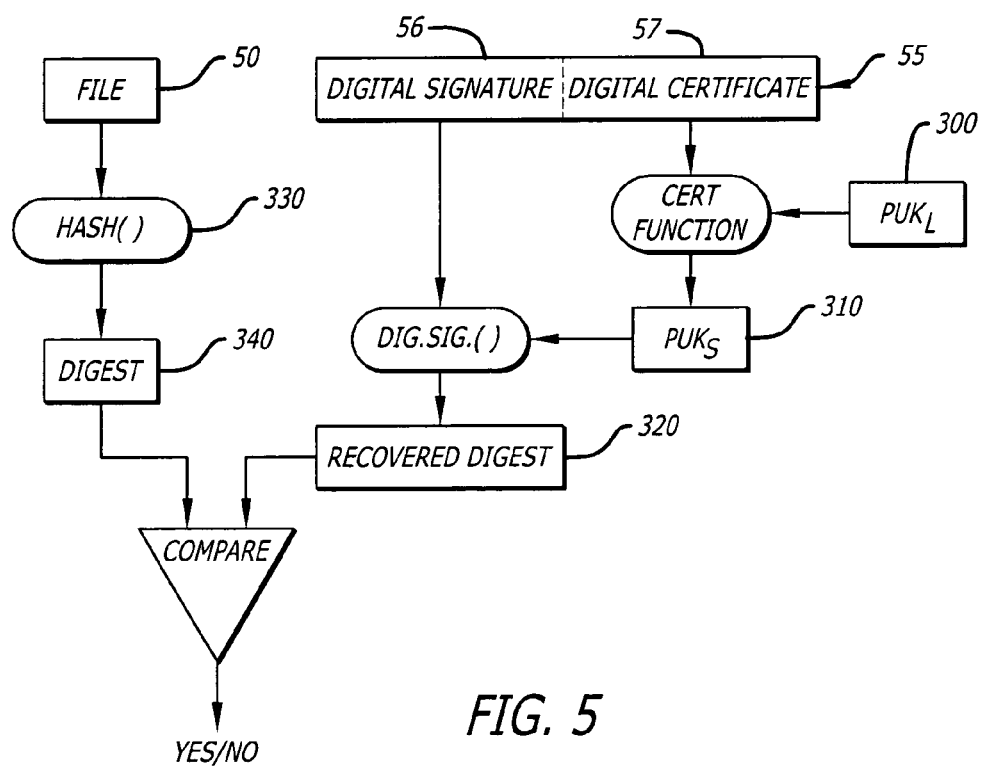
FIG. 5 is an exemplary embodiment of a verification scheme performed by the requesting platform to verify that the signatory has been authorized to perform the file checking scheme and failed to detect an abnormality in the uploaded file.

Alternatively, it is contemplated that the local signatory may be, in effect, implemented in connection with a firewall (e.g., an application gateway) that is configured to preclude transmission and reception of incoming information in certain situations. For instance, for incoming (or even outgoing) files (or email messages) without a corresponding digital signature chain, the local signatory 40 could preclude re-routing of the file to a targeted platform, which is coupled to the LAN, until one of two conditions exists. One condition is for the file checker 45 of the local signatory 40 to receive the file, verify its integrity, and issue a proper digital signature chain to accompany the file if its integrity is verified and acceptable. For files already with a digital signature chain, the local signatory 40 could preclude re-routing of the file to a targeted platform on the LAN unless the digital signature chain has been verified by the local signatory 40. Referring now to FIG. 5, an exemplary embodiment of a verification scheme performed by the requesting platform $35_1$ to verify that the remote signatory 80 has been authorized to perform the file checking scheme and failed to detect an abnormality in the uploaded file 50 is shown. Upon receipt of a digital signature chain 58, inclusive of the digital signature 56 and the digital certificate 57, the platform 35, recovers contents of the digital certificate 57 using a public key ($PUK_L$) 300 of the local signatory 40. The contents of the digital certificate include a public key ($PUK_S$) 310 of the remote signatory 80. $PUK_S$ is used to recover a digest 320 of the uploaded file 50 contained in the digital signature 57. In addition, the file 50 undergoes a hash function 330 to produce a digest 340. If the digest 340 matches the recovered digest 320, the integrity of the file 50 has been verified and the platform $35_1$ allows the file to be opened and/or executed. Of course, other verification schemes inclusive of those described above may be used.

C. ARCHITECTURE OVERVIEW: FILE CHECKER IMPLEMENTED IN THE REQUESTING PLATFORM

Figure 6:
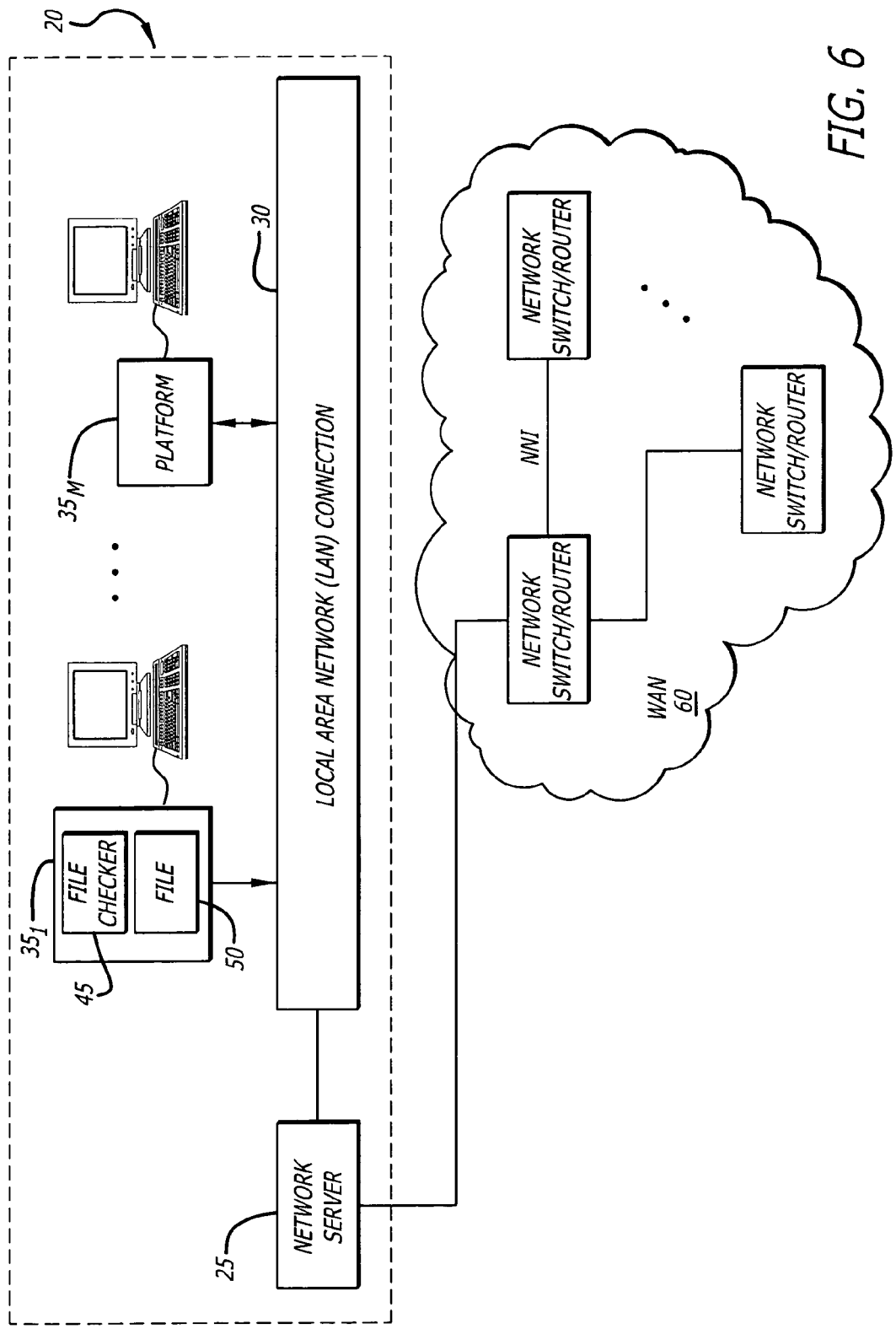
FIG. 6 is an exemplary embodiment of a network configured for that a third embodiment of the invention can be practiced.
Figure 7:
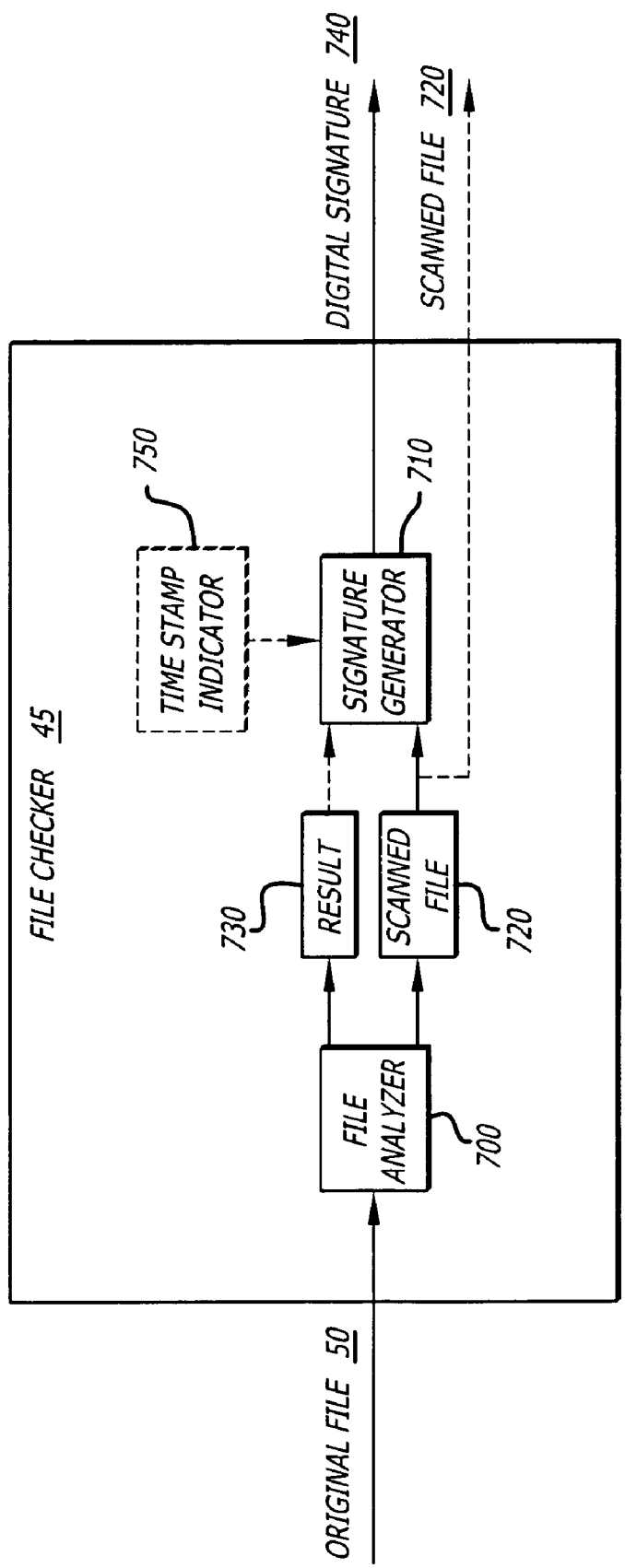
FIG. 7 is an exemplary embodiment of a file checking mechanism in accordance with one embodiment of the invention.

In a third embodiment as shown in FIG. 6, the requesting platform $35_1$ is implemented with the file checker 45 to verify the file integrity. The file checker 45 interfaces to the file 50 to be checked. The requesting platform $35_1$ may have acquired the file 50 from any number of ways. After acquiring the file 50, the requesting platform $35_1$ does not attempt to open it and assumes the file 50 is bad until its integrity is verified by the file checker 45.

D. FILE CHECKER

The basic idea of the invention is to enforce a policy for checking file integrity against virus(es) or intrusion. According to this policy, an unknown file is not opened unless its file integrity is verified. An unknown file is a file that has just been created (e.g., a new file), or that has just been closed (e.g., a modified file). By refusing to open a file with a signature indicating unacceptable file integrity, or without a signature, the platform can be guaranteed that there will be no opportunities for virus to spread out infecting other files or elements.

The file checker 45 checks file integrity of files in a platform. The file checker 45 comprises a file analyzer 700 and a signature generator 710. The file analyzer 700 receives the original file 50 and produces a scanned file 720. The scanned file 720 is the original file 50 after performance of one or more scan operations.

In particular, the file analyzer 700 is a facility to perform scan operations on the original file 50 and return the scanned file 720. The scan operations include, but are not limited or restricted to a virus detection, an intrusion detection, a file integrity detection, or any appropriate program. The virus detection may be a commercial anti-virus program or virus scanner such as the MCAFEE virus scanner, or an intrusion detector based on an expert system or an artificial immune system. The file analyzer 700 generates the scanning result 730 according to the result of the scan. The scanning result 730 may indicate that the original file 50 has an acceptable file integrity (e.g., virus free), an unacceptable file integrity (e.g., infected with virus), or a questionable integrity which may require in-person analysis of the file.

The signature generator 710 receives the scanned file 720 and optionally the result 730 (represented by dashed lines). Thereafter, the signature generator 710 produces a digital signature 740. The digital signature 740 may be part of the digital signature chain 55, described above.

It is further contemplated that the file checker 45 is optimally implemented with a time stamp indicator 750. The time stamp indicator 750 provides information regarding the recency of the scan operation. In one embodiment, the time stamp indicator 750 is one of a calendar time obtained from the platform.

Figure 8:
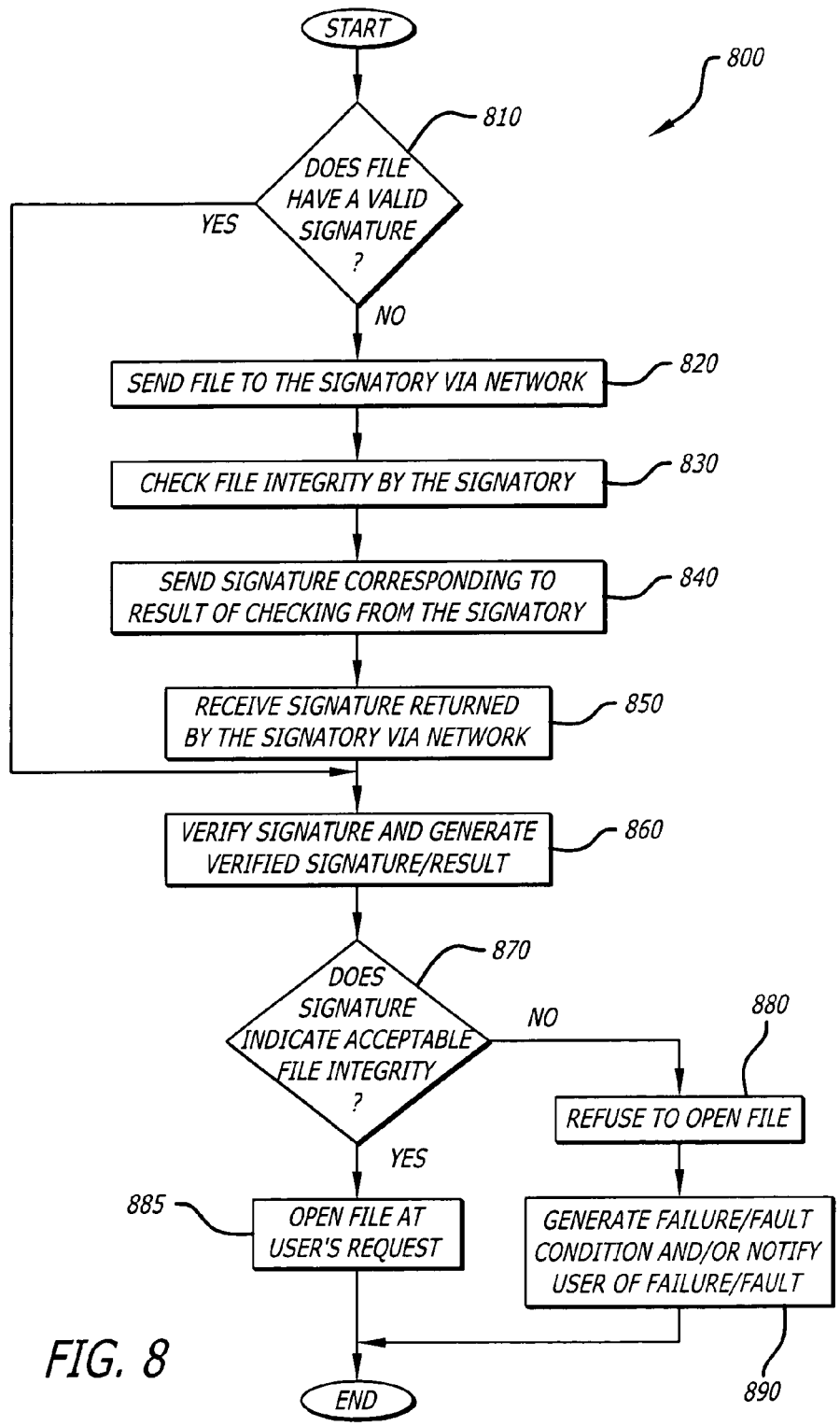
FIG. 8 is an exemplary embodiment of a flowchart of one embodiment of a remote file checking mechanism.

FIG. 8 is a flowchart illustrating a process 800 for remote file checking according to one embodiment of the invention.

Initially, the process 800 determines if the file has a corresponding digital signature chain (Block 810). If so, the process 800 verifies the digital signature chain as described in block 860. Otherwise, the process 800 sends the file to the signatory via a network (Block 820). The signatory checks the file integrity (Block 830). For instance, this can be done by performing a scan operation on the file using a file checker (e.g., a virus detector, an intrusion detector, etc.). Next, the signatory generates and sends a digital signature chain associated with the file indicating the result of the checking via the network (Blocks 840 and 850).

Next, the digital signature chain is verified and generates a verified signature or result (Block 860). Then, a determination is made if the verified signature indicates an acceptable file integrity (Block 870). If not, the files will not be opened or executed and a failure or fault condition is generated to notify the user (Blocks 880 and 890). The process is then terminated. However, if the verified signature indicates acceptable file integrity, the process proceeds to open or execute the file at the user's request (Block 885). The process is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a file analyzer to perform a scan operation on an incoming file to produce a scanning result, and to output the scanning result and the scanned file to accompany a digital signature chain;
    a signature generator coupled to the file analyzer to receive both the scanning result and the scanned file and to produce a digital signature of the digital signature chain based on the scanning result and the scanned file, the digital signature chain is verified prior to accessing the incoming file and access to the incoming file is precluded by the file analyzer unless the digital signature accompanies the incoming file; and
    a time stamp indicator coupled to the signature generator, the time stamp indicator to provide information of the scan operation for insertion into the digital signature chain.

2. The apparatus of claim 1, wherein the incoming file is precluded from being opened if the verified digital signature chain indicates an unacceptable file integrity.

3. The apparatus of claim 1, wherein the incoming file is precluded from being executed if the verified digital signature chain indicates an unacceptable file integrity.

4. The apparatus of claim 1, wherein the incoming file is accessed if the verified digital signature chain indicates acceptable file integrity.

5. The apparatus of claim 1, wherein the apparatus is employed within a platform coupled to a local area network that a platform providing the incoming file is coupled to.

6. The apparatus of claim 1, wherein the apparatus is employed within a platform coupled to a wide area network.

7. The apparatus of claim 1, wherein the platform further comprises a second control unit coupled to the first control unit both being integrated into a chipset, the second control unit including a token bus interface.

8. The apparatus of claim 7, wherein the platform further comprises a token bus coupled to the token bus interface and in communication with at least one token.

9. A method comprising:
sending a file to a signatory via a network, the signatory checking the file and providing a digital signature chain indicating file integrity of the file and timing information of the file checking operation as conducted by the signatory, the digital signature chain includes a digital signature produced by the signatory based on the file and a scanning result of the file, the scanning result indicating if the file has an acceptable file integrity;
verifying the digital signature chain returned from the signatory via the network prior to accessing the file, the verifying of the digital signature chain includes determining whether contents of a digital signature associated with the digital signature chain include a message regarding the integrity of the file; and
accessing the file if the verified digital signature chain accompanies the file and indicates an acceptable file integrity.

10. The method of claim 9, wherein accessing the file comprises opening the file if the verified digital signature chain indicates the acceptable file integrity.

11. The method of claim 10, wherein accessing the file further comprises refusing to open the file if the verified digital signature chain indicates an unacceptable file integrity.

12. The method of claim 9, wherein the digital signature chain includes at least one digital signature and at least one certificate.

13. The method of claim 12, wherein verifying the digital signature chain includes accessing contents of the at least one certificate to determine if the signatory is authorized and accessing contents of the at least one digital signature to determine the integrity of the file.

14. The method of claim 9, wherein the network is a local area network (LAN).

15. The method of claim 14 wherein the scanner is one of a virus detector, an intrusion detector, and a file integrity checker.

16. The method of claim 9, wherein the timing information to identify a time that a scan operation is conducted when checking the file.

17. The method of claim 9 wherein the file contains at least one of a code and a data.

18. An apparatus comprising:
a file analyzer to perform a scan operation on a file that produces a scanning result; and
a signature generator coupled to the file analyzer, the signature generator to produce a digital signature that is based on both the scanning result and the scanned file and is part of a digital signature chain, the digital signature chain being verified prior to accessing the file and access to the file is precluded by the file analyzer unless the digital signature chain accompanies the file.

19. The apparatus of claim 18, wherein the file is precluded from being opened if the verified digital signature chain indicates an unacceptable file integrity.

20. The apparatus of claim 18, wherein the file is precluded from being executed if the verified digital signature chain indicates an unacceptable file integrity.

21. The apparatus of claim 18, wherein the file is accessed if the verified digital signature chain indicates acceptable file integrity.

22. The apparatus of claim 18 being a first platform controlled by a signatory and adapted to analyze the file prior to the file being opened by a second platform differing from the first platform.

23. The apparatus of claim 18 being a first platform controlled by a signatory and adapted to analyze the file prior to the file being executed by a second platform differing from the first platform.

24. The apparatus of claim 18 being the first platform in the same subnetwork as the second platform.

25. The apparatus of claim 18 being the first platform in communication with the second platform over a wide area network (WAN).

26. The apparatus of claim 18 further comprising:
a time stamp indicator coupled to the signature generator, the time stamp indicator to provide information of the scan operation for insertion into the digital signature chain.

* * * * *